July 10, 1928.
C. W. MOORE
SEAL
Filed Nov. 29, 1924
1,676,276
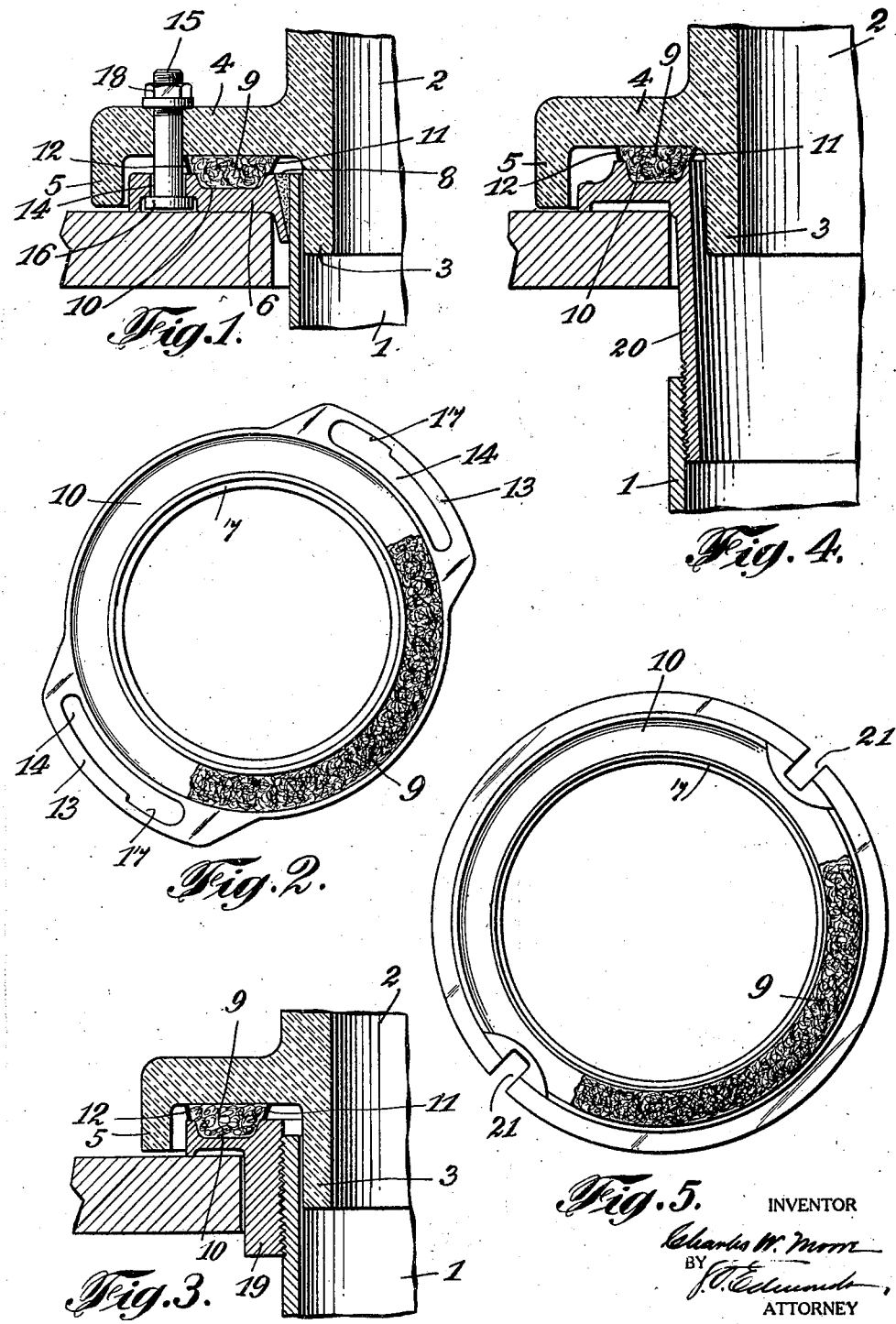

Patented July 10, 1928.

1,676,276

UNITED STATES PATENT OFFICE.

CHARLES W. MOORE, OF NEW YORK, N. Y., ASSIGNOR TO THE MOORE FLANGE CORPORATION, OF NEW YORK, N. Y., A CORPORATION OF NEW YORK.

SEAL.

Application filed November 29, 1924. Serial No. 752,923.

This invention pertains to a simple improved type of sealing means that is especially adapted to seal the joining point of two conduits in a thoroughly satisfactory manner so that leakage of liquid or gas conducted through the conduits is practically impossible.

In particular the invention relates to improved and simplified constructions of the elements constituting a seal of substantially indefinite life and one which automatically maintains itself in proper operating conditions.

Heretofore in the constructional features of seals for sealing the joining points of two conduits, it has very often been required to provide some special knobs, projections and special recesses therefore in order to properly assemble the joints so there will not be leakage. Such special requirements increase the cost of production of the conduits or articles joined together as well as providing knobs or projections which are easily broken off in handling thereby absolutely destroying the value of the pipe or conduit or articles joined.

It is therefore the main object of my invention to eliminate the foregoing disadvantages and to provide an improved seal which does not require special constructional features of the conduits or articles to be joined.

It is a further object in accomplishing my improved results to provide a novel separate element which is readily and satisfactorily affixed to one of the conduits and adapted to cooperate with the other seal elements and the second conduit to form an improved simple seal of long life.

Another object of my invention is to provide an improved self sustaining seal at the joining points of two conduits.

An additional object of the invention is to provide a self adjusting, self maintaining seal to prevent leakage at the joining points of two conduits and to so construct the seal that it is effective against the passing of a vapor as well as against the passing of a liquid.

Further objects and advantages of my invention will become apparent as the detailed description below is read.

While my improved seal is capable of many uses I have employed it for one particular use wherein it has operated most successfully to prevent leakage of liquid and gas at the juncture or joint of two conduits. This particular use is for joining a toilet bowl to a suitable drain pipe. The description herein below set forth will be particularly directed to this use but it is to be understood that such description is made for purposes of properly describing one of the preferred uses of my invention.

The preferred embodiment of my invention is illustrated in the accompanying drawings wherein:

Fig. 1 is a sectional view of the elements of my improved seal;

Fig. 2 is a top plan view of a flange element of the seal showing the reception therein of a resilient material;

Fig. 3 is a sectional view of a flange illustrated in Figs. 1 and 2 but being provided with a modified means of attachment to the drain pipe;

Fig. 4 is a sectional view of a modified form of a flange having a long skirt to be affixed to the drain pipe; and Fig. 5 is a top plan view of the flange illustrated in Fig. 4 and shows a modified form of reception means for suitable fastening bolts.

Referring now to this drawing, the end of a conduit 1 is shown as being normally positioned in alignment with a conduit 2. This second conduit as herein illustrated is the base or foot of a toilet bowl and is provided with an overlap 3 which extends into the conduit 1. This foot is also provided with projection 4 having thereon a subprojection 5. As is usual in the constructions of toilet bowls conduit 2 is made of earthen ware construction or it may be made of any other suitable construction material.

In forming an efficient and satisfactory seal between the ends of these two conduits it is particularly desirable to construct the seal so that it is impossible for gases as well as liquids to pass to the exterior of the conduits. My improved seal readily meets this requirement and has been very satisfactory in practical operation.

In making a seal of the most simplified form and in a form which permits manufacture at a minimum cost, I have found it desirable to provide a suitable flange 6 which may be readily affixed to the end of one of the conduits in any satisfactory and desirable manner, such for instance as by forming a taper 7 on the flange and introducing solder between the tapered portion and the end of the conduit 1 as illustrated at 8 in Fig. 1. A seal means which cooperates with the flange 6 and the projection 4 to prevent the passage of liquid and gas from the interior of the conduits to the outside thereof may be of any desired construction or material. From experience and investigations I find that the sealing means should be such as to remain in a satisfactory condition for a substantially indefinite period of time. It has been found that the putty and rubber packings deteriorate to such an extent that they are unsatisfactory for any length of time. When seals of that construction deteriorate they permit gases to pass from the conduits at their joining points. These gases are very dangerous to health and there is no means of indicating that there is a break in the seal especially when the overlap 3 extends down into the conduit 1 as is the usual construction.

The improved sealing means which I have provided, in its most satisfactory form, consists of a suitable impregnated resilient material 9, such as a felt strip or the like and which may be readily shaped and positioned in a suitable shallow channel 10 formed in the flange 6. In the particular construction which I have herein disclosed it is desirable to form this channel 10 between relatively shallow rims or edges thereby permitting the resilient material to extend above the flange and to engage the projection 4 of the conduit 2. With this construction of seal there are no requirements for special construction of the projection 4 of the bowl 2 thereby eliminating a considerable cost in the construction of the bowls. It will be noted that the flange 6, the resilient material 9 and the projection 4 all cooperate to form a most satisfactory seal. In constructing this seal to prevent deterioration and to prevent the passage of gases, I have found it desirable to impregnate the resilient material 9 with a suitable grease or some substance of that nature that is preferably non-evaporable. It is desirable to have this grease of good consistency and of such nature that it will not dry up and will adhere to the felt when extruded from the strip.

The flange may be of any desired construction and preferably it provides a shallow channel for the reception of the impregnated material and permits the improved type of seal herein described to be formed. In addition, the flange is to provide suitable constructional features to allow proper attachment to the drain pipe and to the bowl or conduit 2. In the preferred construction of flange which I have selected, I have provided a relatively shallow channel in the flange and prefer to have the width of the channel greater than one half the total width of a section through the flange. I also prefer to have the sides of the channel tapering from the bottom to the top as will readily be noted by reference to Figs. 1, 3 and 4. These constructional features I have found to be very satisfactory.

It will now be seen that when the conduit 2 or the bowl is placed in position in alignment with conduit 1, projection 4 will engage the felt and compress the same requiring the felt to completely fill the channel 10 and to bulge somewhat over the edges of the channel as is clearly illustrated in Figs. 1, 3 and 4. This compression will force some of the grease to be extruded from the felt strip and by reason of the relatively rough surface of the felt the grease will adhere thereto and will form a grease seal 11 on the inner surface and a grease seal 12 on the outer surface of the felt strip. It will be noted that these grease seals rest on the top of the flange at the edges of the channel and extend upwardly and engage the projection 4. Since the bowl is made of earthenware or stoneware it will readily be understood that the under surface of the projection 4 will be somewhat rough and that the grease will enter the interstices therein and will thereby hold itself in position against the edge of the felt and between the flange and the bowl 2 thus forming seals against the entrance of air into the resilient material and against the passage of liquid or gas through the seal.

These grease seals are in the nature of coatings which are held in association with the soft flexible material. It is to be noted that they extend between the flange and the second conduit or bowl 2 and perform the function of preventing air to pass into contact with the soft flexible material or felt. These coatings are flexible and are stretched somewhat before they are broken and permit air to reach the felt washer. It is further to be noted that when the grease impregnated soft washer is employed these coatings are automatically formed along the sides of the felt due to the grease being extruded and adhering to the felt. It is to be understood that the coatings may be of material other than grease and that if desired the coatings may be applied separately which may readily be done if flange 5 is not on the bowl 2 or if conduit 2 is of some other shape. The main features of the material for the coatings are that they do not permit air to pass through them and that they will stretch somewhat before breaking. It will be seen that the construction herein disclosed shows that the conduit 2 engages the felt washer across the full width of the same.

It has been observed from this particular type of construction of seal that after the bowl 2 has been placed in position and the felt 9 compressed and the grease extruded that the bowl will automatically adjust itself in position due to the resiliency of the felt, and it will be further observed that the bowl may move relative to the flange to a slight extent without danger of breaking the seals.

It has further been observed that when assembly has thus been completed that the seal itself offers quite a material resistance to being disassembled and therefore the seal is considered as being self maintaining. There may be several reasons assigned for the theory of the resistance to disassembly, but one reason which is considered feasible is that, first, substantially all of the air in the resilient material has been replaced by the impregnation material, and second, that after the assembly has been completed all the air has been forced from between the felt strip and the channel part of the flange and from between the engaging parts of the earthenware bowl 2 and the felt strip, third, that some of the impregnation material or grease has been forced from the felt strip and has not been replaced by air, and fourth, the grease seals extend from the flange along the sides of the felt to the projection 4, thus preventing air to pass. It will be seen that as one endeavors to raise conduit 2 that the grease seals will stretch but still will prevent air from passing into the felt or in between the felt and the channel portion of the flange or between the felt and the projection 4. It is well recognized in physics that when two bodies are moved apart that air or some substance must occupy the space between the bodies or there will be resistance to the separation of the bodies. It is thought that the same theory applies in this instance. Whatever reason is assigned to the resistance, it is a known fact that there is a resistance of this seal to disassembly. Such a phenomena is advantageous and should there not be such a resistance it would appear that there is a break in the seal and consequently a leakage of undesirable gases.

Any suitable means may be employed for maintaining two conduits together and for requiring a positive engagement between the projection 4 and the resilient material 10. One form of engagement which I have found to be satisfactory has the feature of providing ears 13 on the flange 6 and suitably positioning the ears so they are preferably diametrically opposite. These ears are provided with grooves 14 for the reception of holding elements in the form of bolts 15 which are provided with enlarged heads 16. The cutaway portions 17 of the ears permit the bolt to be readily inserted in normal position. Usually these bolts extend through projection 4 and are provided with nuts 18 so that proper assembly of the conduits may be readily obtained.

Referring now to Fig. 3 I have shown a modified form of the flange 6 by providing an extension 19 which is properly screw threaded on its inner surface to receive a screw threaded portion of conduit 1. Likewise in Fig. 4 I have shown the flange provided with an exceptionally long extension or skirt 20 which receives the conduit 1 by means of a screw threaded attachment. As a modification in the form of providing a fastening means for the bolt 15 I have shown the formation of slots 21 (see Fig. 5), thus eliminating the particular formation of ears 13 as illustrated in Fig. 2. Any suitable means may be provided for receiving the bolts or other suitable fastening elements but the constructions herein shown have been satisfactory. I may employ any suitable type of fastening means for affixing flange 6 to conduit 1.

It will be seen from the foregoing description that the flange 6 is of simple construction having a relatively shallow channel therein which is formed in the main top surface of the flange and it will also be observed that the seal which I have preferred to employ is complete for preventing the passage of liquid and gas. The particular seal herein disclosed is somewhat in the nature of a compound or complete seal as the grease seals and an impregnated fabric material cooperate to form a non-leaking complete seal.

It will also be seen that the seal as a whole is simple in construction, easy to assemble and of low cost of manufacture. Further the seal is of such nature that it does not require a special construction of the conduit 2, especially when such conduit constitutes the end of a toilet bowl. It will further be observed that the seal itself is of substantially indefinite life, is self adjusting and is self maintaining. All of these features being especially adapted for the particular use hereinbefore set forth and for other uses wherein my seal is of value.

It will be understood that while I have herein described in detail a particular embodiment of my invention for purposes of full disclosures, and some detailed features which I am specifically claiming for a special advantage, many changes and modifications may be made in the particular construction and arrangement of parts without departing from the broad scope of my invention which is outlined in the sub-joined claims.

What I claim is:—

1. A seal for preventing leakage at the juncture of two conduits, said seal comprising a flange having therein a continuous channel, said flange constructed to be firmly affixed to one of said conduits, a soft material placed in said channel and extending above the flange, said second conduit adapted to engage the full width of said material and when drawn toward the first conduit to put all of said material under compression and to force substantially all of the air out of the same, and two flexible coatings, one on each side of said material and in contact therewith and extending substantially vertically between said flange and said second conduit thereby to form a self maintaining seal that resists disassembly as said coatings are impervious to the passage of air into said material and between said flange and said material and between said second conduit and said material.

2. A seal for preventing leakage at the juncture of two conduits, said seal comprising a flange having therein a continuous channel, said flange constructed to be firmly affixed to one of said conduits, a grease impregnated flexible material placed in said channel and extending materially above said flange, said second conduit adapted to engage the full width of said material and when drawn toward the first conduit to put all of said material under compression and to force substantially all of the air out of the same and to cause said material to fill said channel and leaving some of said material extending above said flange, the compressing also causing said material above said flange to be of greater width than that in the channel and causing some of said grease to be extruded from said material, said grease forming seals which extend along the side of said material and substantially vertically between said flange and said second conduit thereby forming a self maintaining seal which resists disassembly as the material will not expand without air being drawn thereinto and said seals being impervious to the passage of air prevent air from passing into said material.

3. A seal for preventing leakage at the juncture of two conduits, said seal comprising a flange having therein a continuous channel whose depth is less than half of the thickness of said flange, said flange constructed to be firmly affixed to one of said conduits, a grease impregnated felt packing placed in said channel and extending materially above said flange, said second conduit adapted to engage the full width of said packing and when drawn toward the first conduit to put all of said packing under compression and to force substantially all of the air out of the same, said compressing causing said packing to fill said channed and still to extend above said flange and to cause some grease to be extruded from said packing thereby providing vertical grease seals on sides of said packing which extend between said flange and said second conduit, said seal being self maintaining when means for compressing has been released as said grease seals prevent the passage of air into said packing whereby the packing resists the expansion thereby preventing said seals from disassembly until after the grease seals have been broken.

This specification signed this 26th day of November, 1924.

CHARLES W. MOORE.